United States Patent
Schlittenbauer et al.

(10) Patent No.: US 11,448,298 B2
(45) Date of Patent: Sep. 20, 2022

(54) MULTI-SPEED PLANETARY TRANSMISSION FOR A VEHICLE WITH AT LEAST ONE ELECTRIC MACHINE

(71) Applicant: Robert Bosch GmbH, Stuttgart (DE)

(72) Inventors: Tobias Schlittenbauer, Asperg (DE); Ianislav Krastev, Ludwigsburg (DE); Wael Mohamed, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/053,862

(22) PCT Filed: Apr. 30, 2019

(86) PCT No.: PCT/EP2019/061036
§ 371 (c)(1),
(2) Date: Nov. 9, 2020

(87) PCT Pub. No.: WO2019/214995
PCT Pub. Date: Nov. 14, 2019

(65) Prior Publication Data
US 2021/0231199 A1 Jul. 29, 2021

(30) Foreign Application Priority Data
May 8, 2018 (DE) .................... 10 2018 207 110.1

(51) Int. Cl.
*F16H 3/46* (2006.01)
*F16H 37/04* (2006.01)
(Continued)

(52) U.S. Cl.
CPC ............. *F16H 37/042* (2013.01); *B60K 1/00* (2013.01); *B60K 17/08* (2013.01); *B60T 1/005* (2013.01);
(Continued)

(58) Field of Classification Search
CPC ..... B60K 2001/001; B60T 1/005; F16H 3/46; F16H 37/042; F16H 61/0059;
(Continued)

(56) References Cited

U.S. PATENT DOCUMENTS

2008/0194375 A1* 8/2008 Voigt ................. F16H 3/54
475/296
2012/0100953 A1 4/2012 Phillips
(Continued)

FOREIGN PATENT DOCUMENTS

CN 106471281 A 3/2017
CN 107599823 A 1/2018
(Continued)

OTHER PUBLICATIONS

International Search Report for Application No. PCT/EP2019/061036 dated Jul. 30, 2019 (English Translation, 2 pages).
(Continued)

*Primary Examiner* — Huan Le
(74) *Attorney, Agent, or Firm* — Michael Best & Friedrich LLP

(57) ABSTRACT

The invention relates to a multi-speed planetary transmission (10). The multi-speed planetary transmission (10) comprises a driveshaft (12), which comprises a sun gear (18) and a ring gear (19), and an output shaft (14), which comprises a planet carrier with at least one planet gear (30). The drive shaft (12) and the output shaft (14) can be connected together or separated from each other by means of a clutch (20). The multi-speed planetary transmission (10) has a freewheel (26), via which a shift is carried out between a first transmission ratio i_1 and a second transmission ratio i_2 under a load using the clutch (20).

12 Claims, 4 Drawing Sheets

(51) Int. Cl.
*B60K 1/00* (2006.01)
*B60K 17/08* (2006.01)
*B60T 1/00* (2006.01)
*F16H 61/00* (2006.01)

(52) U.S. Cl.
CPC .......... *F16H 3/46* (2013.01); *F16H 61/0059* (2013.01); *B60K 2001/001* (2013.01); *F16H 2200/0021* (2013.01); *F16H 2200/0034* (2013.01); *F16H 2200/2005* (2013.01); *F16H 2200/2035* (2013.01); *F16H 2200/2066* (2013.01); *F16H 2200/2082* (2013.01)

(58) Field of Classification Search
CPC ..... F16H 2200/0021; F16H 2200/0034; F16H 2200/2005; F16H 2200/2035; F16H 2200/2066; F16H 2200/2082
See application file for complete search history.

(56) References Cited

U.S. PATENT DOCUMENTS

2014/0274528 A1* 9/2014 Valente .................. G01N 30/74
475/150
2015/0226297 A1 8/2015 Knoblauch et al.

FOREIGN PATENT DOCUMENTS

DE 102010001259 2/2011
DE 102010001259 A1 * 2/2011 .............. F16H 3/54
DE 102012216132 3/2014

OTHER PUBLICATIONS

Zhang, "Fault Detection and Repair of Automobile Electrical System", 2015, pp. 78-79.

* cited by examiner

Fig. 2.1
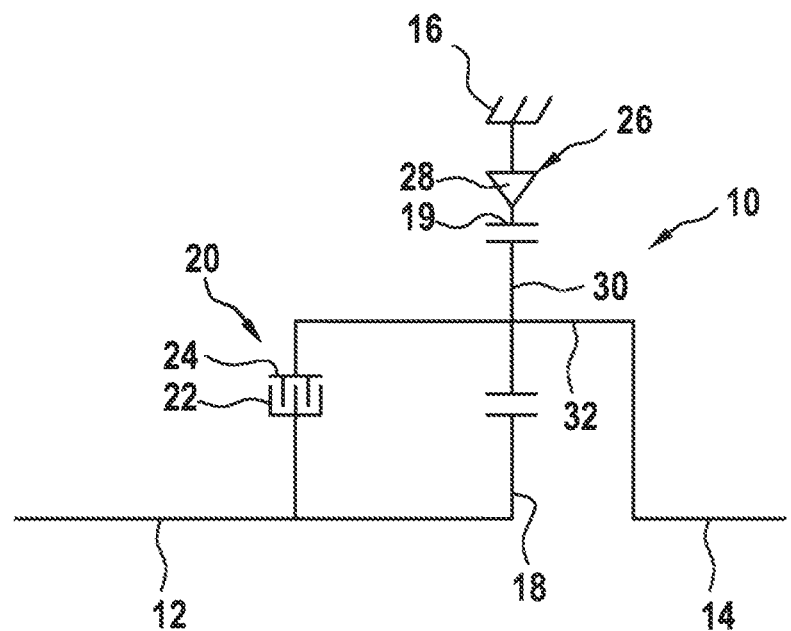
Fig. 2.2
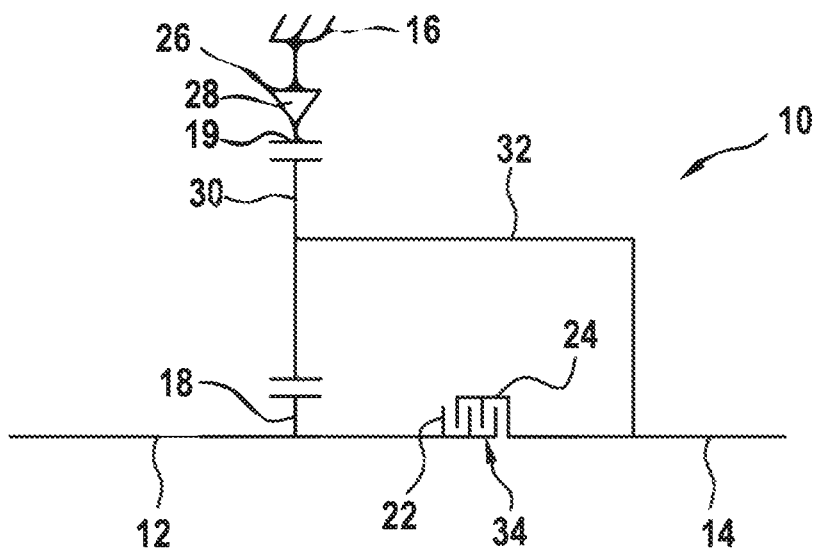

MULTI-SPEED PLANETARY TRANSMISSION FOR A VEHICLE WITH AT LEAST ONE ELECTRIC MACHINE

BACKGROUND OF THE INVENTION

The invention relates to a multi-speed planetary transmission for a vehicle with at least one electric machine and a drive shaft with a sun gear and an output shaft with a planetary gear. The invention moreover relates to the use of the multi-speed planetary transmission integrated into a vehicle axle of a vehicle having at least one electric machine.

US 2015/0226297 A1 relates to an electric axle on the electric drive of a vehicle. An electric axle for an electrically driven vehicle is disclosed which has an electric machine and two countershaft transmissions for driving the wheels of the axle. A shiftable transmission, which takes the form of a planetary transmission with a freewheel and with a differential, is arranged downstream from the electric machine. The electric axle has a displacement mechanism for shifting two gears. In a first gear, a ring gear of the transmission and a clutch body which is formed on the housing are connected to each other and a clutch between the ring gear and the planetary gear carrier of the transmission is open. In a second gear, the ring gear and the clutch body are not connected, the clutch in contrast being closed. The shifting according to US 2015/0226297 A1 is relatively elaborate.

SUMMARY OF THE INVENTION

According to the invention, a multi-speed planetary transmission is proposed, wherein the multi-speed planetary transmission has a drive shaft with a sun gear and a ring gear and an output shaft with a planetary gear carrier with at least one planetary gear. The drive shaft and the output shaft can be connected to each other and disconnected from each other by means of a clutch. The multi-speed planetary transmission has a freewheel via which power shifting between a first gear ratio i_1 and a second gear ratio i_2 by means of a clutch is achieved. The multi-speed planetary transmission proposed according to the invention requires just one clutch to implement power shifting between two gears. In contrast with the solution according to the prior art, in the multi-speed planetary transmission proposed according to the invention changing gear does not require a clutch and a locking device and instead, by virtue of the freewheel, activation of a single clutch is sufficient. This reduces the elaborate nature of the shifting function, which entails a reduction in weight of the multi-speed planetary transmission proposed according to the invention and a simplification of the complexity and a cost saving owing to the use of the freewheel.

In a development of the multi-speed planetary transmission proposed according to the invention, a claw clutch which is capable of immobilizing the freewheel is associated with the freewheel. In particular, when the first gear is achieved, the freewheel is immobilized against a housing of the multi-speed planetary transmission with a first gear ratio i_1, wherein the clutch is open. The first gear ratio i_1 is given by the equation i_1=1 (z_H/z_S), where z_H refers to the number of teeth of the ring gear and z_S the number of teeth of the sun gear.

If it is intended to shift into the second gear of the multi-speed planetary transmission proposed according to the invention with a second gear ratio i_2, the clutch is closed and the freewheel released. The second gear ratio is given by i_2=1, which means that all the central gears, i.e. the ring gear, sun gear and planetary gear carrier, rotate at the same speed and there is no rotational speed difference.

As well as the first gear and the second gear, the multi-speed planetary transmission proposed according to the invention can also be shifted into a reverse gear. To do this, in the case of a vehicle with an electric machine, the latter can, for example, be driven in reverse, wherein the clutch is open and the freewheel is blocked by a locking device associated therewith.

The multi-speed planetary transmission proposed according to the invention can furthermore also be shifted into a parking brake function. To do this, the clutch is closed and the freewheel is moreover blocked by a locking device.

In a further embodiment of the multi-speed planetary transmission proposed according to the invention, the clutch comprises a first clutch part and a second clutch part. In a first alternative embodiment, the first clutch part is housed on the drive shaft, whereas the second clutch part is housed on a spider shaft of the planetary gear. In a second alternative embodiment of the clutch, the first clutch part is likewise housed on the drive shaft, whereas the second clutch part is housed on the output shaft.

The multi-speed planetary transmission proposed according to the invention can be arranged in an axially parallel arrangement with respect to the vehicle axle. The multi-speed planetary transmission proposed according to the invention can drive a differential transmission via one or more star gear stages. In a further possible embodiment, the multi-speed planetary transmission can be integrated into the vehicle axle and drive bevel gears of a direct-drive differential transmission.

The invention furthermore relates to the use of the multi-speed planetary transmission on a vehicle axle of a vehicle having at least one electric machine.

The multi-speed planetary transmission proposed according to the invention is characterized by an ability to shift relatively simply, with which both a first gear ratio and a second gear ratio can be achieved on the output side. Furthermore, a reverse gear can be achieved by the multi-speed planetary transmission proposed according to the invention which can be easily power shifted, as can a parking brake function. The multi-speed planetary transmission proposed according to the invention is furthermore characterized by a reduction in weight, the complexity is moreover substantially simplified by the use of the freewheel, and a cost saving can be obtained. Because a lock is associated with the freewheel, the latter can be arrested relative to the housing, which enables reversing owing to a reverse rotation of the at least one electric machine. The ability of the at least one electric machine to rotate in two directions is likewise not very elaborate.

The multi-speed planetary transmission proposed according to the invention has, in its embodiment as a planetary transmission, the highest power density of all transmissions, can be power shifted without there being any interruption of traction, and a freewheel and a frictional multiple disk clutch can thus advantageously be used. It should in particular be emphasized that the freewheel can be adjusted very simply.

BRIEF DESCRIPTION OF THE DRAWINGS

The invention is described below in detail with the aid of the drawings, in which.

DETAILED DESCRIPTION

Figure 1:
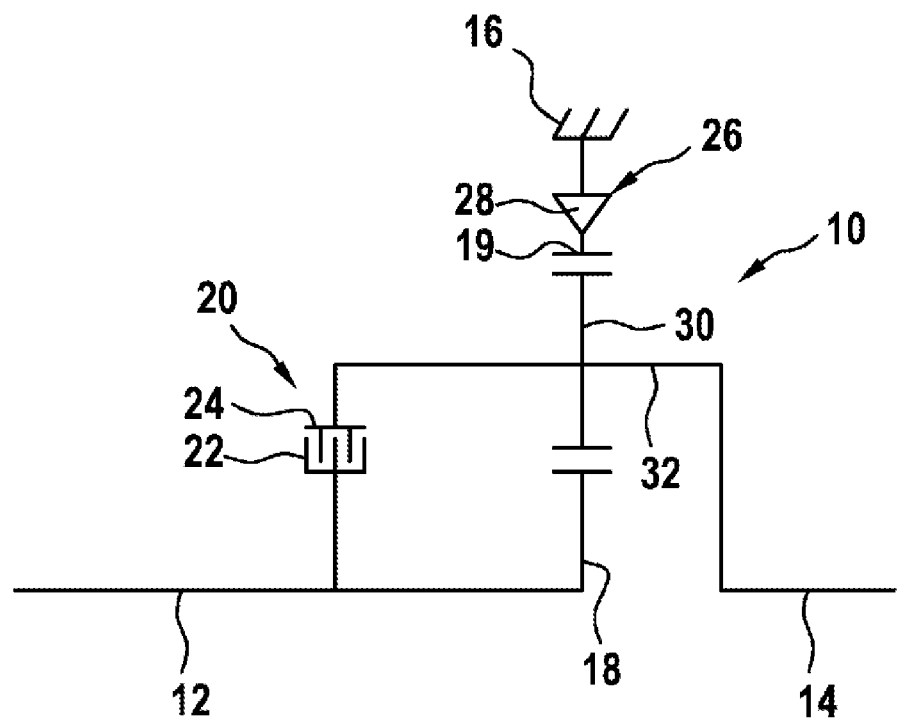
FIG. 1 shows a schematic view of the multi-speed planetary transmission housed between the drive shaft and output shaft, FIGS. 2.1 and 2.2 show possible embodiments of the clutch.

The view according to FIG. 1 shows a multi-speed planetary transmission 10 which is housed between a drive shaft 12 and an output shaft 14.

The multi-speed planetary transmission 10 is housed in a housing 16. A sun gear 18 and a first clutch part 22 of a clutch 20 are situated on the drive shaft 12. The sun gear 18 meshes with at least one planetary gear 30 which comprises a spider shaft 32 and revolves inside a ring gear 19. The spider shaft 32 is connected at one end to the output shaft 14 and at the other end has a second clutch part 24 of the clutch 20. The at least one planetary gear 30 meshes with a freewheel 26 with which a locking device 28 provided, for example, as a claw clutch is associated. The at least one planetary gear 30 can take the form of a single, double or multi-stage planetary gear.

Alternative embodiments of the multi-speed planetary transmission 10 are shown in the views in FIGS. 2.1 and 2.2.

It is apparent from the view in FIG. 2.1 that the clutch 20 comprises the first clutch part 22 which is housed on the drive shaft 12. The first clutch part 22 of the clutch 20 interacts with the second clutch part 24 which, in the alternative embodiment in FIG. 2.1, in a similar fashion to the view in FIG. 1, is situated on the spider shaft 32 of the at least one planetary gear 30. The sun gear 18 housed on the drive shaft 12 meshes with the at least one planetary gear 30, with which the freewheel 26 is associated which can be immobilized against the housing 16 by the locking device 28.

In the alternative embodiment shown in FIG. 2.2 of the multi-speed planetary transmission 10 proposed according to the invention, a shaft-side clutch 34 is formed. In the alternative embodiment shown in FIG. 2.2, the first clutch part 22 is situated at the shaft end of the drive shaft 12. In contrast, the second clutch part 24 is housed at the shaft end of the output shaft 14. In the alternative embodiment of the multi-speed planetary transmission according to FIG. 2.2, the sun gear 18 housed on the drive shaft 12 meshes with the at least one planetary gear 30 which, in a similar fashion to the above alternative embodiments, is associated with the freewheel 26 which can be immobilized against the housing 16 by means of the locking device 28. The spider shaft 32 housed on the at least one planetary gear 30 is connected to the output shaft 14. The multi-speed planetary transmission according to the invention shown in FIGS. 1, 2.1, and 2.2 functions as follows:

A first gear in a gear ratio $i\_1=1$ $(z\_H/z\_S)$ can be achieved by the clutch 20 being opened and the freewheel 26 being immobilized against the housing 26 of the multi-speed planetary transmission 10 by the locking device 28. $z\_H$ refers to the number of teeth of the ring gear 19, and $z\_S$ to the number of teeth of the sun gear 18 of the multi-speed planetary transmission.

A second gear with a gear ratio $i\_2=1$ is achieved by the clutch 20 being closed and the freewheel 26 being released. In this case, all the central gears of the multi-speed planetary transmission 10 rotate at the same speed without there being any rotational speed difference.

The multi-speed planetary transmission 10 proposed according to the invention which can be power shifted can furthermore also be operated in reverse gear. To do this, for example in the case of a vehicle with at least one electric machine 40, the latter rotates in reverse, the clutch 20 is open, and the freewheel 26 is immobilized against the housing 16 by activation of the locking device 28. A reverse gear can be achieved in this shifting position of the components by virtue of the reverse-rotating at least one electric machine 40, wherein a gear ratio $i\_R=1$ $(z\_H/z\_S)$ is achieved in a similar fashion to the first gear in the forward direction.

This corresponds to the gear ratio $i\_1$ in the first gear but as a reverse gear by virtue of the at least one electric machine 40 rotating in the opposite direction.

A parking brake function can furthermore be achieved by the multi-speed planetary transmission 10 proposed according to the invention by the clutch 20 being closed and the freewheel 26 being immobilized via the locking device 28. In this case, the transmission is immobilized and rotation of the drive shaft 12 and the output shaft 14 is impossible because it is obstructed.

Figure 3:
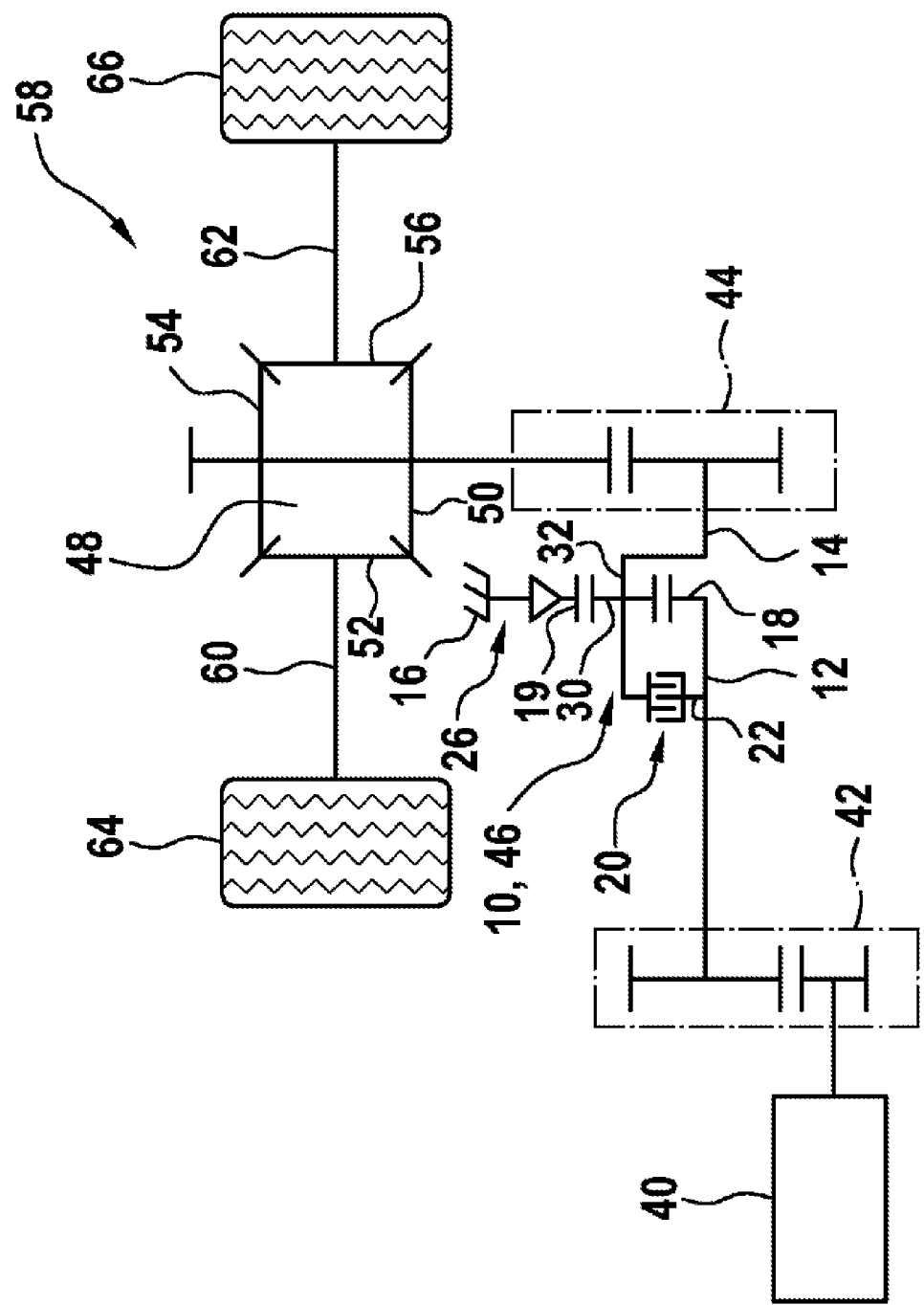
FIG. 3 shows the star gear stages, for driving a differential transmission, associated with the multi-speed planetary transmission proposed according to the invention.

It can be seen in the view in FIG. 3 that the multi-speed planetary transmission 10 is arranged in an axially parallel arrangement 46 with respect to a vehicle axle 58. A first star gear stage 42, which for its part drives the drive shaft 12 of the multi-speed planetary transmission 10, is driven via the at least one electric machine 40. The first clutch part 22 and the sun gear 18 are arranged on said drive shaft 12. The sun gear 18 meshes with the at least one planetary gear 30, with which the freewheel 26 is associated which can be immobilized against the housing 16 of the multi-speed planetary transmission 10 via the locking device 28. The at least one planetary gear 30 has a spider shaft 32 which at one end is connected to the output shaft 14 of the multi-speed planetary transmission 10 and at the other end houses the second clutch part 24 of the clutch 20. The output shaft 14 is connected to a differential transmission 48 via a further second star gear stage 44. The differential transmission 48 has a first bevel gear 50, a second bevel gear 52, a third bevel gear 54, and a fourth bevel gear 56. A first axle part 60 and a second axle part 62 of the vehicle axle 58, on which the first wheel 64 and the second wheel 66 are situated respectively, are in turn driven via the differential transmission 48.

Figure 4:
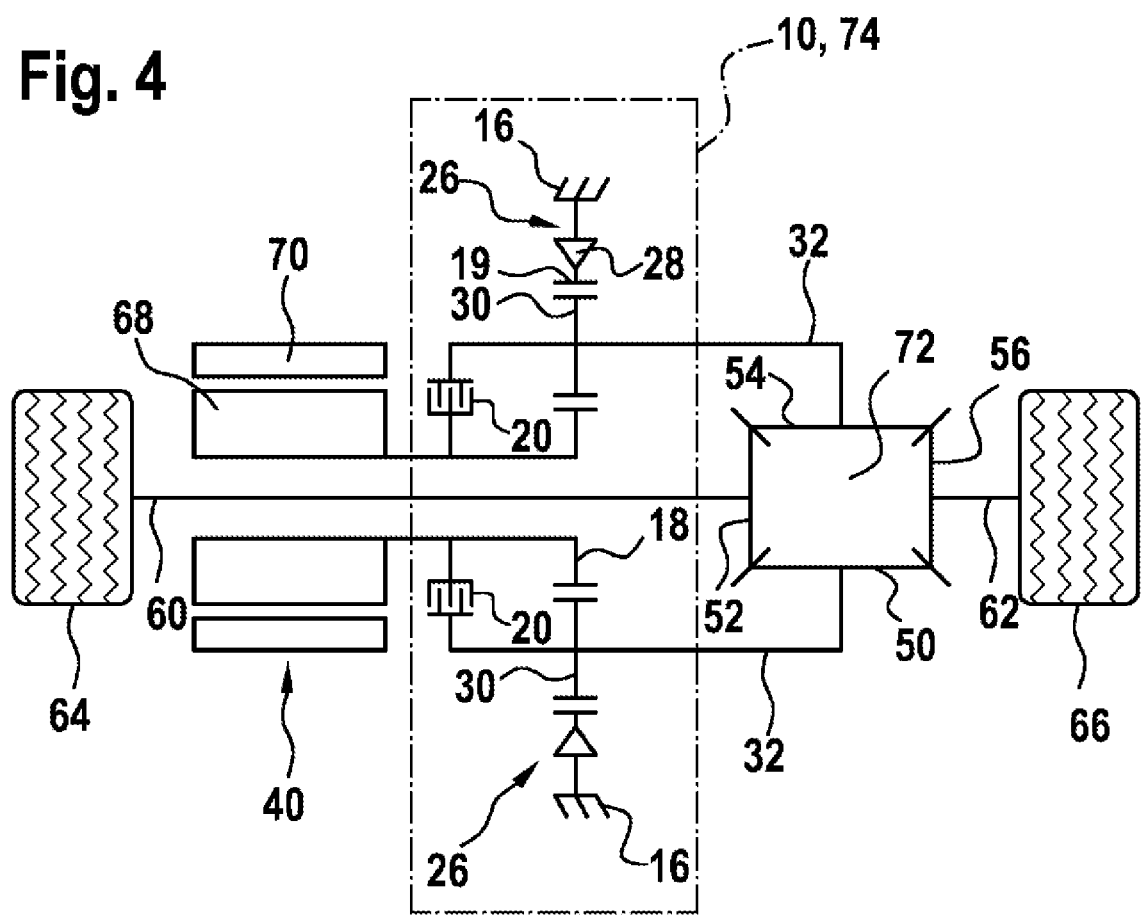
FIG. 4 shows the arrangement of the multi-speed planetary transmission integrated into a vehicle axle.

FIG. 4 shows integration of the power-shiftable multi-speed planetary transmission 10 proposed according to the invention into a vehicle axle 58. As is apparent from FIG. 4, the electric machine 40 is situated coaxially with the vehicle axle 58. The electric machine 40 comprises a stator 70 and a rotor 68. The rotor 68 is connected to the drive shaft 12 of the multi-speed planetary transmission 10. The latter is situated in a coaxial arrangement 74 with respect to the first and second axle part 60 and 62 respectively of the vehicle axle 58. The multi-speed planetary transmission 10 indicated in a dot-dash line in FIG. 4 has a similar structure to the multi-speed planetary transmission 10 shown in FIGS. 1, 2.1, and 2.2. As is apparent from the view in FIG. 4, the multi-speed planetary transmission 10 comprises two planetary gears 30 which mesh with the sun gear 18 which is housed on the drive shaft 12. A freewheel 26, which can in each case be immobilized against the housing 16 of the multi-speed planetary transmission 10 via a separate locking device 28, is associated with each of the planetary gears 30, shown in FIG. 4, of the multi-speed planetary transmission 10. In the view of the multi-speed planetary transmission 10 in FIG. 4, the clutches 20 are designed in such a way that the first clutch parts 22 are situated on the circumference of the drive shaft 12 (see also the view of the multi-speed planetary transmission in FIG. 2.1).

FIG. 4 shows that, in this alternative embodiment, the spider shafts 32 of the planetary gears 30 act as a direct drive for a direct-drive differential transmission 72. In the alternative embodiment shown in FIG. 4, the spider shaft 32 and the output shaft 14, as shown in FIGS. 1, 2.1, and 2.2 on the multi-speed planetary transmission 10, are combined as a single component. In each case the first axle part 60 and hence the first gear 64, as well as the second gear 66 via the second axle part 62, are driven via the direct-drive differential transmission 72, as shown in FIG. 4. As a result of the arrangement shown in FIG. 4, the electric machine 40, the multi-speed planetary transmission 10, and the direct-drive differential transmission 72 represent an assembly, a so-called electric axle.

For the sake of completeness, it should be mentioned that the direct-drive differential transmission 72, in a similar fashion to the differential transmission shown in FIG. 3 which is driven via the star gear stages 42, 44, comprises the first bevel gear 50, the second bevel gear 52, and the third bevel gear 54 and the fourth bevel gear 56. On the output side, the first axle part 60 is driven by the direct-drive differential transmission 72 via the second bevel gear 52, and the second axle part 62 is driven via the fourth bevel gear 56.

Although the above-described multi-speed planetary transmission 10 is shown as a reduction transmission, all forms of simple planetary transmissions according to VDI 2157 2012-10 can be used, such as, for example, a planetary transmission, reduction transmission, or reduction transmission with staged planetary gears.

The invention is not limited to the exemplary embodiments described here and the aspects emphasized therein. Instead, a large number of modifications known to a person skilled in the art are possible within the scope defined by the claims.

What is claimed is:

1. A multi-speed planetary transmission (10) with a drive shaft (12) with a sun gear (18) and a ring gear (19) and an output shaft (14) with a planetary gear carrier which comprises at least one planetary gear (30), wherein the drive shaft (12) and the output shaft (14) are configured be connected to each other and disconnected from each other by a clutch (20), characterized in that the multi-speed planetary transmission (10) has a freewheel (26) via which power shifting between a first gear ratio i_1 and a second gear ratio i_2 by the clutch (20) is achieved, and wherein the multi-speed planetary transmission (10) further comprises a locking device (28) configured to selectively immobilize the freewheel (26), wherein a reverse gear is achieved by driving an electric machine (40) connected to the drive shaft (10) in a reverse direction while the clutch (20) is open and while the freewheel (26) is blocked by the locking device (28), and wherein a parking brake function is implemented by closing the clutch (20) and blocking the freewheel (26) with the locking device (28).

2. The multi-speed planetary transmission (10) as claimed in claim 1, characterized in that, in the case of the first gear ratio i_1, the clutch (20) is open and the freewheel (26) is blocked by the locking device (28).

3. The multi-speed planetary transmission (10) as claimed in claim 1, characterized in that, in the case of the second gear ratio i_2, the clutch (20) is closed and the freewheel (26) is released by the locking device (28).

4. The multi-speed planetary transmission (10) as claimed in claim 1, characterized in that the clutch (20) has a first clutch part (22) and a second clutch part (24).

5. The multi-speed planetary transmission (10) as claimed in claim 4, characterized in that the first clutch part (22) is housed on the drive shaft (12), and the second clutch part (24) is housed on a spider shaft (32) of the planetary gear (30).

6. The multi-speed planetary transmission (10) as claimed in claim 4, characterized in that the first clutch part (22) is housed on the drive shaft (12), and the second clutch part (24) is housed on the output shaft (14).

7. The multi-speed planetary transmission (10) as claimed in claim 1, characterized in that the multi-speed planetary transmission (10) is arranged in an axially parallel arrangement (46) with respect to a vehicle axle (58).

8. The multi-speed planetary transmission (10) as claimed in claim 7, characterized in that the multi-speed planetary transmission (10) drives a differential transmission (48) via one or more star gear stages (42, 44).

9. The multi-speed planetary transmission (10) as claimed in claim 1, characterized in that the multi-speed planetary transmission (10) is integrated into a vehicle axle (58), and drives bevel gears (50, 54) of a direct-drive differential transmission (72).

10. A vehicle comprising
the electric machine (40),
a vehicle axle (58), and
the multi-speed planetary transmission (10) as claimed in claim 1 on the vehicle axle (58).

11. The multi-speed planetary transmission (10) as claimed in claim 1, characterized in that the locking device (28) is configured to selectively immobilize the freewheel (26) relative to a housing (16) of the multi-speed planetary transmission (10).

12. The multi-speed planetary transmission (10) as claimed in claim 11, characterized in that the locking device (28) is configured to selectively immobilize the freewheel (26) against the housing (16).

* * * * *